United States Patent Office 3,440,247
Patented Apr. 22, 1969

3,440,247
REACTION PRODUCTS OF PHOSPHITE DIESTERS WITH IMIDAZOLINES OR OXAZOLINES
Casper J. Dorer, Jr., Lyndhurst, Ohio, assignor to The Lubrizol Corporation, Wickliffe, Ohio, a corporation of Ohio
No Drawing. Continuation-in-part of application Ser. No. 214,491, Aug. 3, 1962. This application Aug. 26, 1966, Ser. No. 575,257
Int. Cl. C07f 9/02; A01n 9/36; C10l 1/26
U.S. Cl. 260—307     10 Claims

ABSTRACT OF THE DISCLOSURE

Reaction products of phosphite diesters with imidazolines or oxazolines are useful as anti-icing additives for liquid hydrocarbon fuels, especially gasoline.

---

This application is a continuation-in-part of copending application Ser. No. 214,491, filed Aug. 3, 1962, now abandoned.

This invention relates to compositions of matter containing nitrogen and phosphorus. More particularly, it relates to a novel method and the products prepared thereby, which method comprises reacting, at about 25–150° C.

(A) A heterocyclic compound having from 4 to 30 carbon atoms and having the general formula

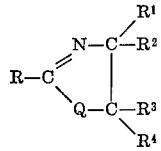

wherein Q is oxygen or $NR^5$; R is a hydrocarbon radical having from 1 to about 19 carbon atoms; $R^1$, $R^2$, $R^3$ and $R^4$ are each hydrogen, alkyl, cycloalkyl, aryl, aralkyl, H—(O—alkylene—)$_x$, or

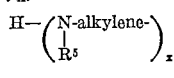

with not more than one of $R^1$, $R^2$, $R^3$ and $R^4$ being aryl: $R^5$ is hydrogen, alkyl, cycloalkyl, H—(O-alkylene-)$_x$, or

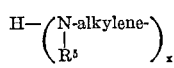

and $x$ is an integer from 1 to about 10; with (B) About 0.1–5.0 moles, per mole of reagent A, of a compound of the general formula $(R'O)_2POH$ wherein R' is an alkyl, aryl, aralkyl, alkaryl or cycloalkyl radical having about 1–20 carbon atoms.

The above-described novel nitrogen- and phosphorus-containing compositions are useful in the preparation of a variety of products such as pesticides, fungicides, wetting agents, and improving agents for use in organic materials such as plastics, asphalt, lubricants, and liquid hydrocarbon fuels such as fuel oils and gasoline. They are particularly useful as improving agents for "leaded" gasoline (i.e., gasoline containing a polyalkyl lead anti-detonant and halohydrocarbon scavengers) in that they reduce or prevent undesirable combustion phenomena such as pre-ignition, "wild ping," etc., which lessen the efficiency of an internal combustion engine. They also impart anti-icing properties to a gasoline.

A principal object of the present invention is to provide a process for preparing new and useful nitrogen- and phosphorus-containing compositions.

Another object is to provide novel nitrogen- and phosphorus-containing compositions.

Still another object is to provide improved hydrocarbon fuels for internal combustion engines.

Other objects will in part be obvious and will in part appear hereinafter.

REAGENT A

The imidazolines and oxazolines useful as reagent A in the method of this invention are readily prepared by any one of several methods. The most convenient involves the condensation of a carboxylic acid with a polyamine or hydroxy amine, as follows.

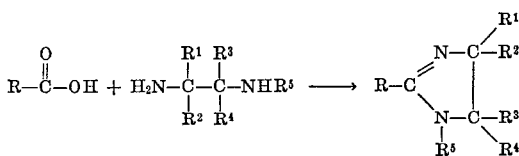

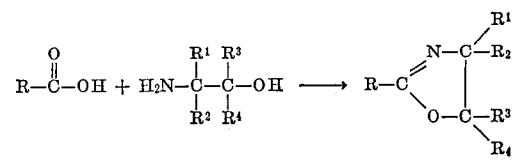

This reaction is particularly effective for preparing compounds in which R is an alkyl, cycloalkyl or aralkyl radical. For the preparation of heterocyclic compounds (especially imidazolines) wherein R is aromatic, the reaction of an amidine with an alkylene dihalide, a nitrile with a diamine in the presence of sulfur, or an ortho ester with a diamine or alkanolamine, is often preferred.

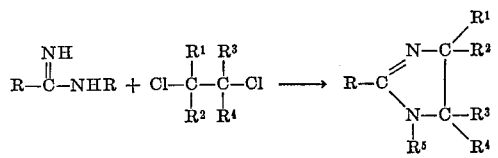

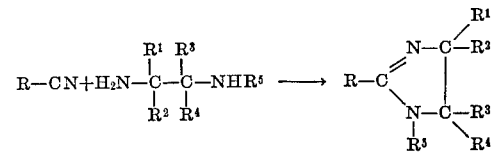

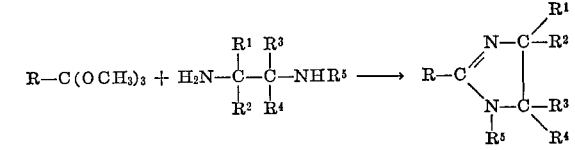

The carboxylic acid used to prepare the imidazoline or oxazoline is preferably aliphatic or cycloaliphatic. It may be saturated or unsaturated and may contain substituents such as chloro, fluoro, bromo, ether, sulfide, keto, hydroxyl, etc., as well as aromatic substituents such as phenyl, tolyl, xylyl, chlorophenyl, hydroxyphenyl, naphthyl, methylnaphthyl, etc. Examples of acids useful for the preparation of imidazolines adapted for the purposes of the present invention are acetic, propionic, butyric, valeric, caproic, caprylic, myristic, palmitic, oleic, linoleic, linolenic, ricinoleic, behenolic, stearolic, stearoxylic, phenylstearic, xylylstearic, chlorostearic, hydroxyphenylstearic, naphthenic, arachidic, tricosanoic, and triacontanoic acids. Mixtures of any of the foregoing acids are likewise useful. In most instances, it is preferred to use a carboxylic acid which contains from about 8 to about 20 carbon atoms.

The term "alkylene amine" is used herein in a generic sense to represent polyamines conforming for the most part to the general formula

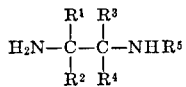

wherein $R^1$–$R^5$, inclusive, are as previously defined. Examples of useful alkylene amines include ethylene polyamines such as ethylene diamine, diethylene triamine, tetraethylene pentamine, N-(3-aminopropyl) - ethylene diamine, and the like, and substituted ethylene polyamines such as propylene diamine, phenylethylene diamine, o-tolylethylene diamine, benzylethylene diamine, cyclohexylethylene diamine, etc. The unsubstituted ethylene polyamines are preferred, however, and they may be employed as pure compounds or as mixtures such as "Polyamine H," a commercial mixture of ethylene polyamines containing about 3–7 amino radicals per molecule.

The term "alkanolamine" is also used in a generic sense to represent monoamino- or polyamino-substituted monohydric or polyhydric alcohols conforming for the most part to the formula

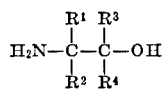

wherein $R^1$–$R^4$, inclusive, are as previously defined. Examples of useful alkanolamines are ethanolamine, 2-aminopropanol - 1, 2 - amino-2-methylpropanediol - 1,3, 2-amino-2-phenylpropanol-1, 2-amino-1-benzylpropanol-1, 2 - amino - 2 - (3-aminopropyl)butanediol-1,3, 2-aminobutanol-1, 2-aminooctanol-1, etc. Also useful are mixtures of any of these alkanolamines.

When $R^1$, $R^2$, $R^3$, $R^4$, and $R^5$ are hydrogen atoms, the resulting products are monosubstituted imidazolines and oxazolines such as 2-heptadecenylimidazoline and 2-heptadecenyloxazoline. When at least one of $R^1$, $R^2$, $R^3$, $R^4$, and $R^5$ is a substitutent other than hydrogen such as enumerated hereinabove, the resulting products are polysubstituted imidazolines and oxazolines such as 2-heptadecenyl-4-(beta - aminoethyl)imidazoline and 2 - heptadecenyl-4-(beta-hydroxyethyl)-oxazoline. The nomenclature used herein to describe imidazolines and oxazolines conforms to that set forth on pages 16 and 17 of "The Ring Index" (Second Edition) by Patterson, Capell, and Walker (1960), published by the American Chemical Society.

For the purposes of the present invention it is preferred to use imidazolines and oxazolines which contain from about 10 to about 30 carbon atoms in the molecule. The use of such imidazolines and oxazolines as starting materials results in products which possess the desired degree of solubility in organic materials such as plastics, lubricating oils, and liquid hydrocarbon fuels. It is not necessary that the imidazoline or oxazoline reagent be a chemically pure material. It is convenient and sometimes preferable from a commercial standpoint to use crude imidazolines and oxazolines which are obtained by exhaustive dehydration of fatty acid-alkylene amine or fatty acid-alkanolamine mixtures. A number of such products are available commercially under the trade designations 'Alkaterge-C" (crude 2-heptadecenyl-4-methyl-4-methyloxazoline) and "Nalcomines" G–11 through G–14 (crude hydroxyethyl-substituted imidazolines derived from fatty materials such as tallow and coconut oil). In some instances it is desirable to use mixtures of imidazolines or oxazolines.

Other examples of imidazolines and oxazolines useful as reagent A in the hereindescribed process include 2-naphthenyl - imidazoline, 1-(beta-aminopropyl)-2-hexacosylimidazoline, 1 - (beta-hydroxyethyl)-2-heptadecenylimidazoline, 1-(beta - aminoethyl)-2-heptadecenylimidazoline, 1 - (N - beta - aminoethyl - aminoethyl)-2-pentadecenylimidazoline, 1-(beta-hydroxy - ethoxyethyl)-2-tridecylimidazoline, 1 - aminoethyl-2-heptylimidazoline, 1-aminoethyl-2-propyl-imidazoline, 2 - heptadecenyl - 4,4-dimethyloloxazoline, 2 - hexyl-4,5-di-(beta-hydroxyethyl) oxazoline, 2 - eicosyloxazoline, 2 - heptacosyloxazoline, 2-naphthenyloxazoline, and the like.

REAGENT B

This reagent is a phosphite diester, i.e. ,a compound of the formula $(R'O)_2POH$ where $R'$ is an organic radical of the type described hereinabove. Generally $R'$ will be an unsubstituted radical such as methyl, ethyl, propyl, butyl, amyl, hexyl, octyl, decyl, cetyl, octadecyl, eicosyl, tolyl, ethylphenyl, amylphenyl, methylnaphthyl, benzyl, phenethyl, phenyl, naphthyl, anthracyl, phenanthryl, cyclopentyl, cyclohexyl, methylcyclohexyl, or the like. In some instances, however, $R'$ may contain chloro, fluoro, nitro, nitroso, sulfide, keto, ether, or ester substituents. Examples of such substituted radicals include 2-fluoroethyl, 2-nitropropyl, 2-ethoxyethyl, 2-thioethoxypropyl, 3-ketobutyl, carbethoxyethyl, para-chlorophenyl, alpha-nitronaphthyl, etc. For the purposes of this invention, $R'$ is generally an aliphatic radical and preferably a lower alkyl radical containing from 1 to about 6 carbon atoms such as methyl, ethyl, n-propyl, isopropyl, n-butyl, isobutyl, n-hexyl, isoamyl, n-amyl, neopentyl, 4-methyl-2-pentyl, etc.

Phosphite diesters can be prepared by any of several well-known processes, the most convenient of which involves the reaction of phosphorus trichloride with an alcohol or a phenol. Specific examples of phosphite diesters useful as reagent B herein include dimethyl phosphite, diethyl phosphite, di-n-propyl phosphite, diisopropyl phosphite, di-n-butyl phosphite, diisobutyl phosphite, di-n-amyl phosphite, di-(4-methyl-2-pentyl)phosphite, dineopentyl phosphite, dioctyl phosphite, dibenzyl phosphite, diphenyl phosphite, ditolyl phosphite, dicyclohexyl phosphite, di-(4-methylcyclohexyl)phosphite, methyl ethyl phosphite, ethyl propyl phosphite, butyl hexyl phosphite, and phenyl octadecyl phosphite. In lieu of a single phosphite, it is sometimes desirable to use mixtures of two or more different phosphite diesters. A particular preference is expressed, however, for dimethyl phosphite.

The relative proportions of reagents A and B and the reaction conditions employed in preparing compositions of this invention are not particularly critical. There is some evidence that the reaction involves about equimolar amounts of reagents A and B. This is not to say, however, that lesser or greater amounts of either reagent cannot be employed. It has been found, as indicated, that compositions useful for the purposes of this invention can be prepared using as little as 0.1 mole or as much as 5 or more moles of reagent B, the phosphite diester, per mole of reagent A. Ordinarily it is preferred, however, to use about equimolar amounts of reagents A and B in the interest of convenience and economy of starting materials.

The reaction between reagents A and B is slightly exothermic and can be carried out at any temperature from about room temperature (25° C.) to a temperature just beneath the decomposition temperature of the reaction mass. In order to insure complete reaction, it is generally preferred to heat the reaction mass for 0.5 to 8 hours at 70–150° C. If an excess of one reagent, for example, the phosphite diester, is employed, it may be desirable in some instances to strip such excess from the reaction mass. In other instances, however, the excess of either reagent may be allowed to remain in the product.

The structures of the compositions of this invention are not known. Infra-red analyses of the products prepared by the reaction of an imidazoline or an oxazoline with a phosphite diester show absorption peaks which are not present in any of the starting materials used. The nature of the chemical bonds indicated by these new absorption peaks has not been ascertained.

The method of this invention is illustrated by the following examples.

Example 1

A mixture of 1883 grams (12.92 moles) of isooctanoic acid, 928 grams of a 3:1 weight mixture of triethylene tetramine and diethylene triamine, and 200 grams of toluene is boiled at 135–220° C. over a period of 18.5 hours while water and toluene are removed by azeotropic distillation. Water, 393 grams (84.6% of theory for imidazoline formation), is removed during the distillation process. The residue is then heated to 160° C./5 mm. to remove the last traces of water and toluene solvent. Filtration of the residue yields 2,403 grams of crude imidazoline.

213 grams (1 mole) of this crude imidazoline and 132 grams (1.2 moles) of dimethyl phosphite are mixed at 100° C. The exothermic reaction which ensues carries the temperature to about 132° C. Thereafter, the whole is maintained at 100–110° C. for 3 hours and then stripped at 85° C./2 mm. Hg to remove the excess dimethyl phosphite, which amounts to 22 grams (0.2 mole). The residue remaining in the flask, amounting to 334 grams, is the desired product. It shows the following analysis.

| | Percent |
|---|---|
| Phosphorus | 9.32 |
| Nitrogen | 8.82 |

Example 2

142 grams (0.5 mole) of oleic acid and 120 grams (2.0 moles) of ethylene diamine are mixed over 0.75 hour at 25–47° C. The excess ethylene diamine is then removed by distillation of the mass at 31–40° C./17 mm. Thereupon 50 grams of toluene is added to the residue and the whole is dehydrated by heating it from 135 to 167° C. over a period of 5 hours. The theoretical amount of water (18 grams) for imidazoline formation is recovered in the distillate. The residue is then distilled, yielding a fraction boiling at 194–213° C./1 mm., which is substantially pure 2-heptadecenylimidazoline.

A 44-gram portion (0.144 mole) of the above imidazoline and 20 grams (0.182 mole) of dimethyl phosphite are introduced into a reaction vessel and stirred for 6 hours at 120–125° C. Thereafter, the whole is heated at 62–64° C. vapor temperature/15 mm. to remove the excess dimethyl phosphite. The residue, containing approximately equimolar proportions of 2-heptadecenylimidazoline and dimethyl phosphite, amounts to 61 grams. It shows the following analysis.

| | Percent |
|---|---|
| Phosphorus | 7.97 |
| Nitrogen | 5.34 |

Example 3

Naphthenic acid (3,465 grams, 11 moles), 3,102 grams (11 moles) of oleic acid, and 1,580 grams of 3:1 weight mixture of triethylene tetramine and diethylene triamine are diluted with 800 grams of toluene. The whole is boiled at 135–215° C. over a 15 hour period while toluene and water of reaction are removed. The amount of water collected amounts to 645 grams, or 81.4% of the theoretical amount for imidazoline formation. The residue is then stripped at 165° C./4 mm. to remove traces of water and toluene. Upon filtration there is obtained 7,513 grams of a crude mixed imidazoline.

A 556-gram portion (1.48 average moles) of the above imidazoline and 162.5 grams (1.48 moles) of dimethyl phosphite are mixed in a reaction vessel. A slight heat of reaction is noted. The whole is heated for 3 hours at 95–117° C. and then stripped at 130° C./2.5 mm. to remove unreacted dimethyl phosphite. About 16 grams of dimethyl phosphite are recovered. The residue, which is the desired product, shows the following analysis.

| | Percent |
|---|---|
| Phosphorus | 5.39 |
| Nitrogen | 5.99 |

Example 4

The commercial oxazoline known by the trade designation "Alkaterge-C" (186 grams, 0.52 mole) and 66 grams (0.6 mole) of dimethyl phosphite are heated for three hours at 95–100° C. The whole is then heated to 85° C. liquid temperature/3 mm.; no distillate is recovered. The residue, which is the desired product, shows the following analysis.

| | Percent |
|---|---|
| Phosphorus | 5.16 |
| Nitrogen | 3.22 |

Example 5

A product is made by the method of Example 1, except that 166 grams (1.2 moles) of diethyl phosphite is used in place of the dimethyl phosphite specified.

Example 6

A product is made by the method of Example 2, except that 45.5 grams (0.182 mole) of di-(4-methyl-2-pentyl) phosphite is used in place of the dimethyl phosphite specified.

Example 7

A product is made by the method of Example 4, except that 116 grams (0.6 mole) of di-n-butyl phosphite is used in place of the dimethyl phosphite specified.

Example 8

A product is made by the method of Example 1, except that 146 grams (1 mole) of 2-phenylimidazoline is used in place of the imidazoline specified.

Example 9

A product is made by the method of Example 4, except that 112 grams (0.5 mole) of 2,4-diphenyloxazoline is used in place of the oxazoline specified.

As indicated earlier, the compositions of this invention are useful as pesticides, fungicides, wetting agents, and improving agents for a wide variety of organic materials. When used as improving agents for asphalt or other bituminous materials, the compositions of this invention will generally be present in amounts ranging from about 0.1 to about 5 percent (by weight), preferably 0.25–2 percent. For the improvement of lubricating oils, especially mineral lubricating oils, generally from about 0.05 to about 10 percent and preferably 0.1–5 percent of the compositions of this invention will be employed. A lubricant compounded, for example, from SAE 20 Mid-Continent solvent-refined mineral oil plus 0.25 percent of the product of Example 4 serves as an oxidation-resistant crankcase oil. The compositions of this invention are likewise useful as improving agents for the lubricating oil-fuel mixtures employed in the operation of two-cycle engines. In a liquid hydrocarbon fuel such a leaded gasoline, as little as 0.001–0.15 percent of a composition of this invention is effective. For example, 64 mg. of phosphorus as the product of Example 3 added to a gasoline containing 3.5 ml./gallon of a commercial tetraethyl lead fluid is effective to reduce the incidence of carburetor icing and pre-ignition when such fuel is used in a high-compression gasoline engine. The amount of the product of Example 3 expressed in weight percent of the gasoline is approximately 0.045 percent.

It is believed that the bucking and stalling of carbureted gasoline engines, particularly during cool, humid weather, is caused by ice which forms near the circumference of the throttle plate. This ice restricts the flow of the air-gasoline mixture into the combustion chambers and causes an idling engine to stall.

The utility of the compositions of this invention as anti-icing agents for gasoline is shown by means of a laboratory carburetor icing test. The apparatus for this test consists of a 6-gallon cylindrical tower packed with crushed ice, a rudimentary carburetor with atttached throttle body and throttle plate, a 30-inch mercury manometer, and two vacuum pumps. The carburetor is fashioned from a brass venturi tube into which gasoline is introduced by means of a No. 20 hypodermic needle. The attached throttle body consists of a 1.5-inch outside diameter Lucite tube fitted with a circular brass throttle plate. A hollow cooling jacket surrounds the Lucite tube and the mercury manometer is connected to a tap located at the exit of the Lucite tube. During the operation of the apparatus, cold air is drawn from the iced tower through the cooling jacket by means of one of the vacuum pumps, thus cooling the Lucite tube to 9–13° C. The other vacuum pump, which is attached to the exit of the Lucite tube, draws cold, humid air from the iced tower, mixes it with fuel in the carburetor, and causes the resulting air-fuel mixture to pass through the cooled Lucite tube fitted with the throttle plate. When ice forms on the throttle plate, this is reflected in a sharp increase in the vacuum registered on the manometer. The time required for this increase to occur is a measure of the anti-icing properties of the gasoline; that is, the longer the time, the better the anti-icing characteristics of the gasoline.

The improved anti-icing characteristics secured by incorpating a composition of this invention in a gasoline are clearly shown in the following table.

Table.—Laboratory anti-icing test

| Improving agent in the test gasoline (isooctane): | Time in seconds for a sharp increase in vacuum to occur |
|---|---|
| None (control) | 17 |
| 0.005% by weight of the product of Example 3 | 47 |
| 0.008% by weight of the product of Example 4 | 35 |

What is claimed is:

1. A method for preparing nitrogen- and phosphorus-containing compositions which comprises reacting, at about 25–150° C.

(A) a heterocyclic compound having from 4 to 30 carbon atoms and having the general formula

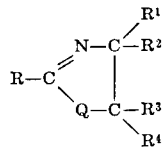

wherein Q is oxygen or $NR^5$; R is a hydrocarbon radical having from 1 to about 19 carbon atoms; $R^1$, $R^2$, $R^3$ and $R^4$ are each hydrogen, alkyl, cycloalkyl, aryl, aralkyl, H—(O-alkylene-)$_x$, or

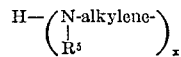

with not more than one of $R^1$, $R^2$, $R^3$ and $R^4$ being aryl; $R^5$ is hydrogen, alkyl, cycloalkyl, $$H—(O\text{-alkylene-})_x$$

or

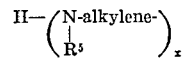

and $x$ is an integer from 1 to about 10; with (B) about 0.1–5.0 moles, per mole of reagent A, of a compound of the general formula $(R'O)_2POH$ wherein $R'$ is an alkyl, aryl, aralkyl, alkaryl or cycloalkyl radical having about 1–20 carbon atoms.

2. The method of claim 1 wherein reagents A and B are present in approximately equimolar amounts.

3. The method of claim 2 wherein Q is oxygen.

4. The method of claim 2 wherein $R'$ is an aliphatic hydrocarbon radical having from one to 20 carbon atoms.

5. The method of claim 3 wherein $R'$ is an aliphatic hydrocarbon radical having from one to 20 carbon atoms.

6. The method of claim 2 wherein reagent B is dimethyl phosphite.

7. The method of claim 3 wherein reagent B is dimethyl phosphite.

8. The method of claim 2 wherein reagent A is 2-heptadecenylimidazoline and reagent B is dimethyl phosphite.

9. The method of claim 2 wherein reagent A is 2-heptadecenyl-4-methyl-4-methyloloxazoline and reagent B is dimethyl phosphite.

10. A composition of matter prepared by the method of claim 1.

References Cited

UNITED STATES PATENTS 3,239,532  3/1966  Rufenacht _____ 260—307
3,308,161  3/1967  Shen _____ 260—309.6

ALEX MAZEL, *Primary Examiner.*

R. J. GALLAGHER, *Assistant Examiner.*

U.S. Cl. X.R.

260—309.6; 44—63, 69; 424—269, 270; 252—357; 208—17, 19